United States Patent [19]
Kunselman

[11] 3,807,749
[45] Apr. 30, 1974

[54] SKIBOGGAN

[75] Inventor: Maurice H. Kunselman, Oak Ridge, Tenn.

[73] Assignee: J. W. Redmond, Oak Ridge, Tenn.

[22] Filed: Dec. 1, 1971

[21] Appl. No.: 203,783

[52] U.S. Cl............................ 280/12 H, 280/21 R
[51] Int. Cl............................................. B62b 13/16
[58] Field of Search........ 280/18, 12 R, 12 H, 12 K, 280/12 KL; 9/310 B

[56] References Cited
UNITED STATES PATENTS

| 3,378,275 | 4/1968 | Rockwood | 280/18 |
| 3,026,120 | 3/1962 | Guerard | 280/12 KL |
| 1,834,979 | 12/1931 | Skoglund | 280/12 H |
| 664,215 | 12/1900 | Hickson | 280/12 KL |
| 3,380,090 | 4/1968 | Kenmuir | 9/310 B |
| 2,139,513 | 12/1938 | Nelson | 280/18 |

Primary Examiner—Robert R. Song
Attorney, Agent, or Firm—Fitch, Even, Tabin & Luedeka

[57] ABSTRACT

A recreational device adapted to receive a rider in a generally upright position thereon and having flexible hold down members along the opposite side margins of the device for gripping by the rider to stabilize his position with respect to the device. Outrigger deflector plates are provided on opposite side margins of the rear portion of the device and are carried out of contact with the supporting surface except when effecting a turn of the device.

6 Claims, 7 Drawing Figures

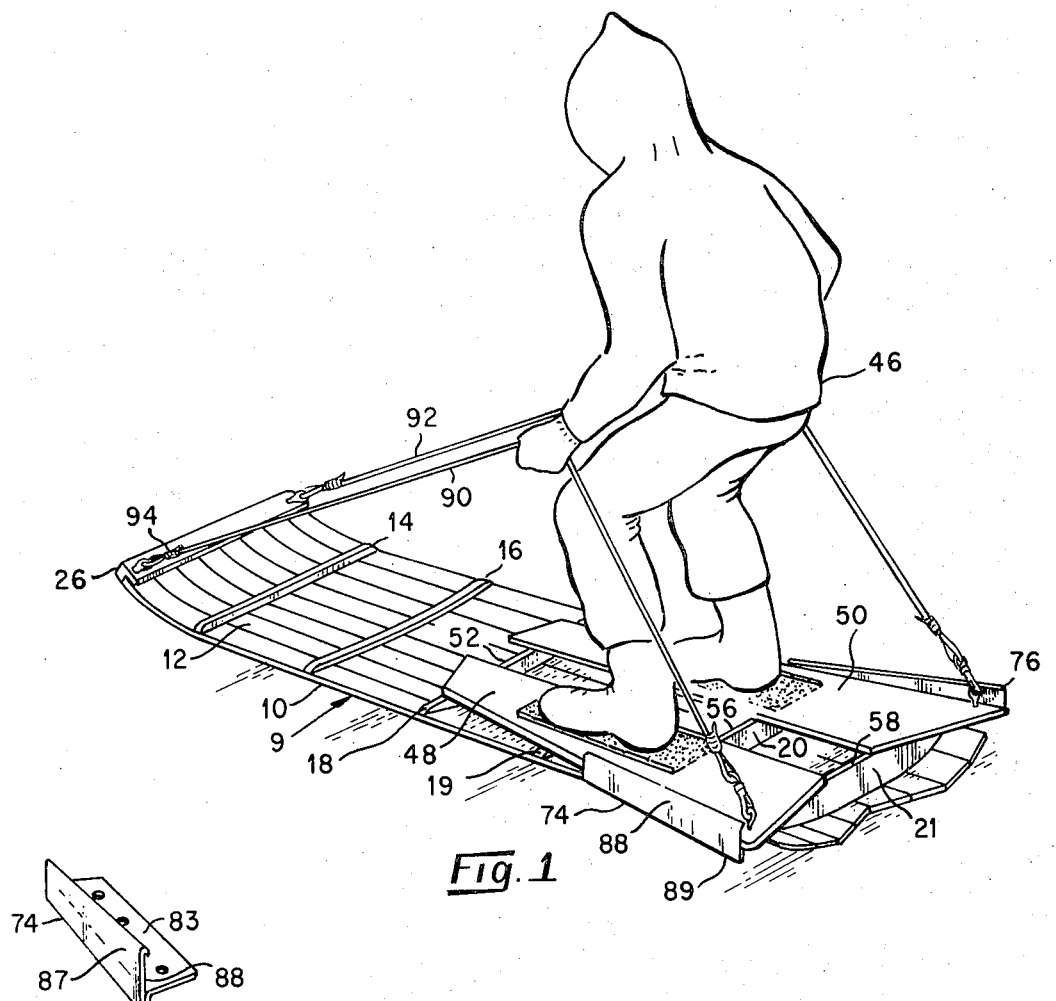
Fig. 1
Fig. 7
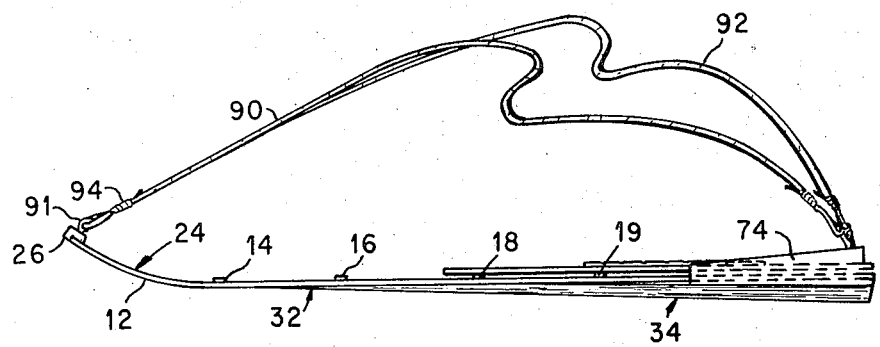
Fig. 2

SKIBOGGAN

This invention relates to recreational devices of the type on which the rider may place his feet and stand in a generally upright position.

Many coaster type recreational devices for use on surfaces such as snow or the like are known in the art. The disadvantages and inadequacies of such existing recreational devices are well recognized. For example, the common sled or toboggan type device is adapted for receiving a rider or riders in sitting position on the device and provision is not made for receiving riders in a crouched or standing position. On the other hand, the usual ski device is adapted to receive the rider in a standing position but the dexterity and skill required of a skier discourages many persons from pursuing the exciting sport of negotiating a downhill run on snow. Also, skis normally are secured to a skier's boots and can produce serious injury in the event of a fall.

Special sled or ski devices are known in the art which include a single flexible strand secured at one of its ends to the forward tip of the sled or ski and which is adapted to be grasped by a rider standing on the sled or ski. Such standup type devices, however, provide no support against centrifugal, deceleration or vertical forces and are prone to escape from beneath the rider's feet and throw the rider to the supporting surface, especially so if the device encounters an obstacle or other condition which abruptly slows the forward movement of the device, not infrequently with resultant damage or injury to the rider or the device. These and other devices of the prior art are not readily maneuverable for purposes of making turns, as when coasting down a curving slope, and the rider is required to effect the desired turn by means of long sweeping arcs in his path of travel and with great strain upon his legs and ankles to maintain balance. Consequently, many persons are precluded from enjoying the sport of downhill travel on a standup coaster type recreational device.

It is an object of the present invention to provide a recreational device for receiving a rider in a stable generally upright position thereon. It is also an object to provide a recreational device of the type described which is readily maneuverable by natural movements of the rider and capable of acute turns. It is a further object to provide a device of the type described wherein means is provided to prevent the rider from being dislodged from the device by acceleration, deceleration, centrifugal or vertical forces. Other objects and advantages of the invention will be recognized from the following description, accompanying claims and the drawings in which:

FIG. 1 is a representation of a vehicle with a rider mounted thereon and embodying various of the features of the invention;

FIG. 2 is a side elevational view of the vehicle of FIG. 1;

FIG. 7 is a representation of a deflector in accordance with the present disclosure.

Figure 3:
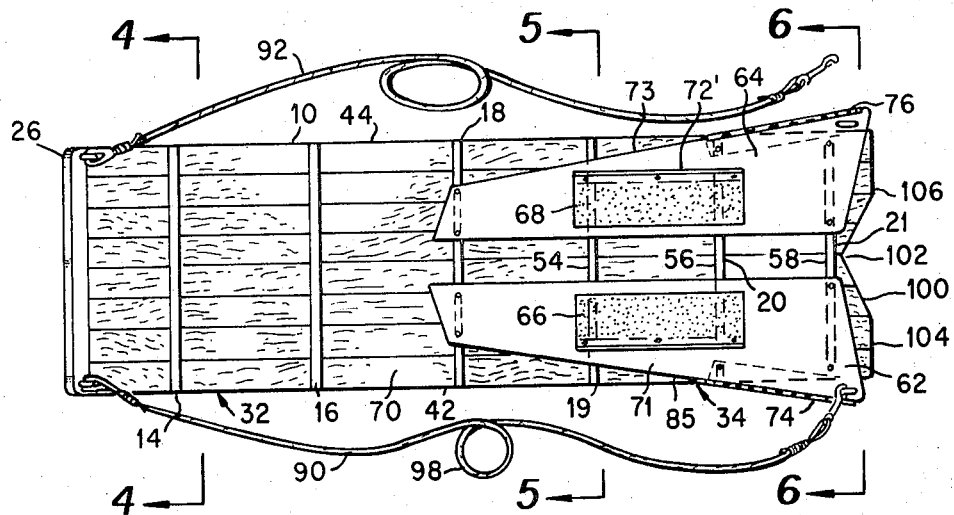
FIG. 3 is a top view of the vehicle of FIG. 1.

Stated broadly, the disclosed recreational device is of a generally planar and rectangular shape with an upwardly curved leading edge. The bottom surface of the device transits from the leading edge through a generally planar section to a trailing portion having a substantially planar longitudinal center with its outer marginal edges curving outwardly and upwardly from the side margins of the planar center. Footboards are mounted on and preferably slightly above the upper surface of the device and extend from approximately the rear of the device forwardly to a point approximately adjacent the transverse centerline of the device. The footboards extend outwardly and rearwardly of the device in generally outrigger fashion. Deflector means are provided on the outer side margins of each of the outrigger footboards and flare rearwardly and outwardly from the device at an angle with respect to the longitudinal centerline of the device. Flexible strand means are provided on opposite side margins of the upper surface of the device, the strands being secured at one of their respective ends to the approximate leading edge of the device and secured at their respective other ends to the trailing portion of the device, each of the strands being of sufficient length between its attached ends as will permit a crouched or standing rider, when mounted on the device, to grasp one of the flexible strands in each of his hands at the approximate midpoint of the strand and thereby stabilize his position with respect to the device.

Referring to the Figures, and as shown in FIG. 1, the vehicle 9 includes a generally planar elongated body 10 formed of a plurality of parallelly aligned slats 12 which are attached to transverse rib members 14, 16, 18, 19, 20 and 21 spaced at intervals along the length of the parallel slats. Preferably, two or more of the slats 12 project beyond the bottom surface 23 of the vehicle by a short distance, about three-eighths inch for example to define elongated fin keels 22 and 22' for improving the lateral traction of the vehicle on a supporting surface such as snow. Alternatively, the elongated body is formed of a solid material such as injection molded plastic, the latter being more economical from a fabrication standpoint. The transversely connected slats 12 are bent upwardly at the forward end 24 of the vehicle to define an upturned leading edge 26 which permits the vehicle to move forwardly over a supporting surface without digging into the surface.

Figure 4:
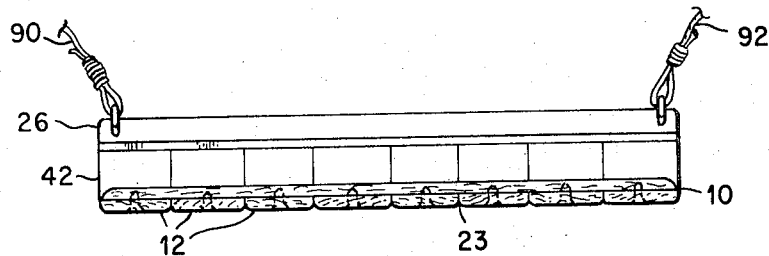
FIG. 4 is a sectional view along line 4—4 of FIG. 3.
Figure 5:
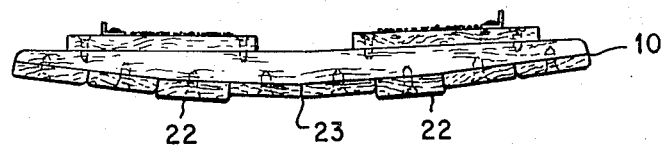
FIG. 5 is a sectional view along line 5—5 of FIG. 3.
Figure 6:
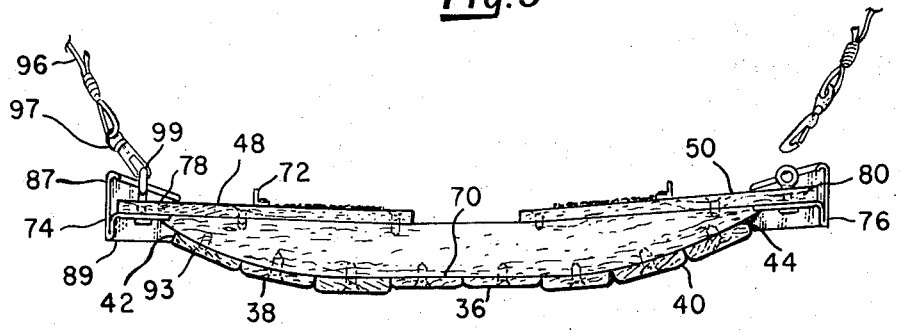
FIG. 6 is a sectional view along line 6—6 of FIG. 3.

As best seen in the cross sectional views of FIGS. 4-6, the vehicle body 10 transits from the upturned leading edge 26 through a generally planar intermediate portion 32 to a trailing portion 34 which comprises, in cross section, a longitudinal central flat portion 36 flanked on opposite sides thereof by upwardly curved portions 38 and 40 which extend outwardly and upwardly from the central flat portion to terminate at the lateral marginal edges 42 and 44 of the vehicle. This transition is accomplished by selection of the geometry of the several ribs so that their lower margins define the desired degree of transition from a planar cross section to the cross section shown in FIG. 6 and referred to hereinabove. As will appear hereinafter, the described transition is particularly useful in controlled steering of the vehicle to effect turning thereof in the course of a downhill run.

A rider 46 is supported on the vehicle by placing one of his feet on each of two footboards 48 and 50 secured to the upper edges 52, 54, 56 and 58 of the rib members 18, 19, 20 and 21. Each footboard comprises an elongated planar member which overhangs the lateral margins 42 and 44 of the vehicle body 10 in the trailing section 34 thereof. The uppermost surfaces 62, 64 of the boards are provided with foot retainers 66 and 68 each comprising a roughened surface for developing frictional engagement with the rider's foot. An elongated, preferably metal, strip 72 along the outer marginal edge of each foot retainer provides additional means for assuring that a rider's foot does not slide laterally from the footboard and thereby dislodge the rider from the vehicle. In the illustrated embodiment of the vehicle, the footboards 48 and 50 are disposed above the top surface 70 so that a rider seated or squatting on the vehicle can grasp the edges of the footboards as at 71 and 73 to hold himself on the vehicle.

Deflector means 74 and 76 are provided on the side edges 71 and 73 of each of the overhanging portions 78 and 80 of the footboards 48 and 50 in outrigger fashion. As illustrated in FIG. 7, each of the deflector means 74 comprises an elongated section of sheet metal having a horizontal portion 83 adapted to be secured to the underside of the overhanging portion 78 of a footboard 48 and a vertical portion 88 which lies against the side edge 85 of the footboard and extends along a substantial part of its length to define a vertical, generally flat surface 87 disposed at a rearwardly flared angle with respect to the longitudinal centerline of the vehicle. The bottom edge 89 of the deflector preferably terminates at a horizontal level approximately equal to the horizontal level of the most outwardly lateral slat 93, but not lower than the flat center portion 36 of the trailing section 34 of the vehicle body. Accordingly, as the vehicle is caused to coast over a supporting surface, the defelctors 74 and 76 are carried substantially out of contact with the supporting surface so long as the vehicle is maintained in a generally parallel attitude with respect to the supporting surface over which the vehicle is traveling. The deflectors, however, are disposed sufficiently near the supporting surface as will cause one of them to engage such surface when the vehicle body is rotated about its longitudinal axis to cause one edge thereof to dip toward the supporting surface. The vertical portion 88 of each deflector forms an acute angle with the longitudinal centerline of the vehicle preferably between about 10 and 45 degreees. As desired, the angle may be adjustable by appropriate adjustable mounting of the deflector on the footboard (not shown). Such angles of less than about 10 degrees fail to produce sufficient outwardly flaring of the deflector, hence insufficient steering control upon tilting of the vehicle as will be referred to further hereinafter. Angles greater than about 45 degrees result in inordinate drag forces when the deflector is engaged with the supporting surface such as snow or the like. The usefulness of these features in steering will be further referred to hereinafter.

The vehicle is provided with a pair of flexible line means 90 and 92 secured at the opposite side margins of the vehicle and adapted to be grasped by a rider to stabilize his position on the vehicle. The flexible lines 90 and 92 preferably comprise a rope but other suitable line means such as a cable or plastic filament suitably serve as the line means. One line 90 is attached on each lateral margin of the vehicle with one end 94 of the line being secured to the leading edge 26 of the vehicle as by passing the line through an eye bolt 91 in the leading edge and knotting or otherwise securing the end of the line to prevent its withdrawal, and the other end 96 of the line being attached to the trailing portion 34 of the vehicle, as by means of an eye bolt 99 anchored on the footboard 48, both points of attachment being near their respective end of the vehicle. The preferred line is of a length sufficient to define a loop portion 98 which is grasped in the hand of a rider in a semi-crouched position on the vehicle and thereby pulled taut to exert a force which pulls the rider and vehicle toward each other. The rearwardly disposed end of a line preferably is releasably connected to the vehicle as by means of a snap hook 97 secured to the end of the line and engaging an eye bolt 99 or the like on the vehicle so that the rear end of each line may be disconnected and the two lines can then be used in the manner of tow ropes.

When a rider is mounted on the vehicle with his feet placed on the roughened surfaces of the footboards 48 and 50, and in a semicrouched position with one of the lines 90 and 92 grasped in each of his hands, the rider's position with respect to the vehicle is stabilized in several respects. The upward pull by the rider against the lines 90 and 92 maintains good contact between the vehicle and the rider's feet. This engagement is imporant when traversing a terrain which offers opportunities to jump the vehicle when going over a hill, mound or the like, the upward force applied by the rider by way of the lines serving to hold the vehicle in engagement with the rider's feet.

By reason of the lines 90 and 92 being anchored at their opposite ends to the leading and trailing ends of the vehicle as referred to above, when the rider mounts his feet on the vehicle and grasps the lines 90 and 92 in his hands, he develops a multiple triangular anchorage between himself and the vehicle. More specifically, when a line is grapsed and pulled taut, there is formed a triangle having one of its apexes located at the point where the line is grapsed by the rider and its other two apexes located at the points of attachment of the opposite ends of the line to the leading and trailing edges of the vehicle. The base of the triangle is the vehicle itself. A similar triangle is formed with the other line on the opposite side of the vehicle. Still further, additional "triangles" are formed diagonally between opposite corners of the vehicle as through the forward portion of one line (left side, for example), through the rider, and the rear portion of the other line (right side). The apexes of this triangle are the forward point of attachment of the left line, the rider, and the rearward attachment of the right line. A similar triangle is formed diagonally from the front right to the rear left of the vehicle. This system of triangular anchorage of the rider to the vehicle provides support against the rider being thrown from the vehicle by such forces as acceleration, deceleration and/or centrifugal thrusts arising during turning of the vehicle.

The rider's grasp upon the rearwardly attached lines particularly stabilizes the rider against his being thrown forwardly off the vehicle in the event the vehicle encounters an obstacle or other rough surface which abruptly increases the frictional engagement of the vehicle with the supporting surface thereby causing the vehicle to abruptly slow its speed and tend to throw the rider forwardly over the vehicle. By reason of the attachment of the lines to the trailing end of the vehicle, when the rider experiences such a forward thrust, he can check his forward movement by pulling the lines which due to their rearward anchored attachment hold him upright against the thrust. The rearward and forward attachment of the lines further aids in acceleration and deceleration of the vehicle. As noted, the rider mounts the vehicle on the approximate rear half thereof. This places the center of gravity of the vehicle to the rear thereof and causes the rear end to dig into the supporting surface and the front end to project above such surface. The degree of such tilt of the vehicle is controllable by the rider grasping the lines in his hands and leaning more or less forwardly or backwardly, his feet never changing their location on the vehicle. By leaning forwardly, the degree of tilt is decreased, the vehicle tends to plane and increase its forward speed. Leaning backwardly increases the tilt of the vehicle, causing its rear end to dig in and slow the forward progress of the vehicle.

Steering of the vehicle is accomplished by a combination of forces which principally involve the shifting of the rider's weight toward the direction in which it is desired that the vehicle turn and simultaneously exerting an upward lifting force against that line on the side of the vehicle opposite the side toward which the rider's weight is shifted. As the rider shifts his weight toward one side of the vehicle, the vehicle is caused to rotate about its generally longitudinal axis to cause that side of the vehicle on the inside of the desired turn to dip toward the supporting surface and cause the deflector on the inside edge of the vehicle to dig into the supporting surface and impart a turning movement to the vehicle which forces the leading edge of the vehicle into the turn and the trailing end out of the turn. This turning moment is enhanced by reason of the upward lifting of force exerted by the rider against the line on the outside edge of the turning vehicle causing such outside edge to be lifted slightly off the supporting surface and simultaneously causing the inside turning edge of the vehicle to dig into the supporting surface and assist in completing the turn. Side slip of the vehicle out of the turn is decreased by the side edges of the projecting fin keel slats also dipping into the supporting surface to aid in preventing lateral movement of the vehicle during a turn as well as side drag developed by the inside deflector. The flat longitudinal center portion of the vehicle body serves as a type of runner when the vehicle is generally parallel to the supporting surface, the side portions of the body contributing to the area of contact between the vehicle body and the supporting surface to the degree determined by the rider's weight, the type of surface, etc. The parallelly oriented vehicle thus coasts efficiently and rapidly. When turning the vehicle, the flat center serves as an elongated fulcrum about which the vehicle is tilted to cause one of the vehicle edges to dig in and develop the described turning moment.

As noted above, braking of the vehicle is accomplished by the rider shifting his center of gravity rearwardly of the vehicle as by leaning backward and simultaneously pulling upon the forwardly anchored ends of the lines 90 and 92 to cause the leading edge of the vehicle to rear upwardly and to cause the trailing edge of the vehicle to dig into the supporting surface, thereby increasing the frictional drag at the trailing edge of the vehicle and slow its forward movement. Improved braking and reduced fishtailing of the vehicle when its leading edge is reared upwardly during braking operations is obtained by recessing the center of the trailing edge 100 of the vehicle as at 102 (see FIG. 1) to define rearwardly projecting trailing end portions 104 and 106 on opposite sides of the rear of the vehicle. When traveling over snow, for example, these rearwardly extending end portions 104 and 106 dig into the snow while permitting a portion of the snow to pass through the recess 102 therebetween and reduce the tendency of the vehicle to fishtail.

The rider's position on the vehicle is readily abandoned voluntarily in the event of an impending collision or other dangerous condition by releasing his grasp on the lines and stepping off the vehicle. Thus the rider may maintain his position on the vehicle in all but obviously dangerous situations while retaining the ability to escape the vehicle and avoid injury. Particularly, the rider is not tied to the vehicle as by bindings or the like which can result in injuries of the general kind that often are encountered by skiers.

The preferred vehicle is fabricated principally of wood but it will be apparent that other materials of construction are suitable. whereas a specific embodiment has been shown and described, it is not intended that the invention be limited to the specific embodiments employed for descriptive purposes herein, but rather, it is intended to cover all modifications and alternate constructions falling within the spirit and scope of the invention as defined in the appended claims.

What is claimed is:

1. A recreational vehicle comprising a generally elongated body including a leading portion having a substantially planar bottom surface and a trailing portion having a ground engaging bottom surface adapted to frictionally engage a suppporting surface including a flowable medium, said bottom surface including an elongated substantially planar central section aligned with the longitudinal centerline of said vehicle and elongated flanking side sections on opposite sides of said central section, said flanking side sections curving upward and laterally outward from said central section, the radius of curvature of said curving side sections decreasing from the front end of said trailing portion toward the rear end of said trailing portion, outrigger means secured to said trailing portion of said body and including a portion extending laterally outwardly from each of the opposite side edges of said trailing portion, deflector means on each of the outwardly extending portions of said outrigger means, said deflector means being held out of substantial engagement with said supporting surface when said body is disposed generally parallel to such supporting surface whereby neither of said deflectors provides substantial vertical support to said vehicle, each of said deflectors including a generally planar vertical portion having substantial surface area and which flares rearwardly outward from said body at an acute angle with respect to the longitudinal centerline thereof whereby when said vehicle is tilted about its longitudinal centerline during forward motion of the vehicle, one of said deflectors engages said flowable medium and develops a lateral force directed generally toward the longitudinal centerline of said vehicle and bring about a to effect rotation of said vehicle and bring about a change in the direction of forward movement of said vehicle without substantially changing the total vertical force exerted by said vehicle against said supporting surface, flexible line means on each of the opposite side margins of said body, one end of such line means being anchored to said leading portion and its other end anchored to said trailing portion of said body and being of sufficient length to be grasped by a rider mounted on said vehicle for stabilizing himself with respect to said vehicle, and means on said trailing portion for receiving a rider in an upright position thereon with his feet in side-by-side relationship.

2. The recreational vehicle of claim 1 wherein said flexible line means is releasably secured at the points of attachment thereof to the trailing portion of said vehicle.

3. The recreational vehicle of claim 1 wherein said outrigger means comprises a pair of footboards including roughened upper surfaces for receiving the feet of a rider thereon.

4. The recreational vehicle of claim 1 wherein said vertical portion of each of said deflectors forms an angle between about 10 and 45 degrees with respect to the longitudinal centerline of said vehicle.

5. The recreational vehicle of claim 1 wherein said flexible line means comprises a pair of lines, one of which is disposed on each of the opposite side margins of said vehicle, one of the ends of each line being anchored to the leading portion and the other of the ends being anchored to the trailing portion of said vehicle, each of said lines being of a length greater than the length of said vehicle whereby a rider mounted on said vehicle with his feet residing thereon can grasp one of said lines with one of this hands and stabilize himself with respect to said vehicle by pulling upwardly on said lines.

6. The recreational vehicle of claim 1 wherein said trailing portion is recessed approximately centrally of its most rearward transverse dimension to define rearwardly extending portions on opposite sides of the vehicle which dig into the supporting surface when the leading edge of said vehicle is reared upwardly.

* * * * *